(12) United States Patent
Seames et al.

(10) Patent No.: US 8,450,541 B2
(45) Date of Patent: May 28, 2013

(54) METHOD FOR PRODUCING CYCLIC ORGANIC COMPOUNDS FROM CROP OILS

(75) Inventors: Wayne S. Seames, Grand Forks, ND (US); Darrin S. Muggli, Atchison, KS (US); Brian M. Tande, Fargo, ND (US)

(73) Assignee: The University of North Dakota, Grand Forks, ND (US)

( * ) Notice: Subject to any disclaimer, the term of this patent is extended or adjusted under 35 U.S.C. 154(b) by 761 days.

(21) Appl. No.: 12/626,304

(22) Filed: Nov. 25, 2009

(65) Prior Publication Data

US 2010/0145117 A1 Jun. 10, 2010

Related U.S. Application Data

(60) Provisional application No. 61/118,066, filed on Nov. 26, 2008.

(51) Int. Cl.
*C07C 1/00* (2006.01)

(52) U.S. Cl.
USPC ............. 585/240; 585/14; 585/266; 585/268; 44/605

(58) Field of Classification Search
USPC 585/240, 242, 14, 266, 268; 44/605; 560/179
See application file for complete search history.

(56) References Cited

U.S. PATENT DOCUMENTS

| | | | |
|---|---|---|---|
| 4,364,745 A | 12/1982 | Weil | |
| 4,420,644 A | 12/1983 | Huibers et al. | |
| 4,992,605 A | 2/1991 | Craig et al. | |
| 5,233,109 A | 8/1993 | Chow | |
| 5,520,708 A | 5/1996 | Johnson et al. | |
| 5,578,090 A | 11/1996 | Bradin | |
| 5,705,722 A | 1/1998 | Monnier et al. | |
| 5,986,133 A | 11/1999 | Holtzapple et al. | |
| 6,284,008 B1 | 9/2001 | Caprotti | |
| 7,014,668 B2 | 3/2006 | Golubkov et al. | |
| 7,041,738 B2 | 5/2006 | Krull et al. | |
| 7,045,100 B2 | 5/2006 | Ergun et al. | |
| 7,928,273 B2 * | 4/2011 | Bradin | 585/14 |
| 8,076,504 B2 * | 12/2011 | Kubatova et al. | 560/179 |
| 8,183,422 B2 * | 5/2012 | Alegria et al. | 585/240 |

(Continued)

OTHER PUBLICATIONS

R. O. Dunn, et al., "Low-Temperature Properties of Triglyceride-Based Diesel Fuels: Transesterified Methyl Esters and Petroleum Middle Distillate/Ester Blends", from JAOCS, vol. 72, No. 8, pp. 895-904 (1995).

(Continued)

*Primary Examiner* — Nina Bhat
(74) *Attorney, Agent, or Firm* — Kinney & Lange, P.A.

(57) ABSTRACT

A method for producing products containing cyclic organic compounds from biomass oil includes adding a biomass oil to a vessel; heating the biomass oil to crack the biomass oil; removing undesired or unreacted materials, heavy ends, and light ends from the cracked biomass oil; and extracting components from the cracked biomass oil to produce a mixture of products containing between 5% and 90% cyclic organic compounds by weight. A method for producing a high-octane aviation fuel with low lead content includes cracking a biomass oil, separating a middle distillate mixture from cracked biomass oil, decarboxylating the middle distillate mixture to produce a mixture of products containing at least about 50% cyclic alkane and alkene compounds by weight, and blending the mixture of products with a fuel having an octane number below 95 to produce an aviation fuel having an octane number of at least 100.

26 Claims, 2 Drawing Sheets

U.S. PATENT DOCUMENTS

| | | | |
|---|---|---|---|
| 8,236,999 B2 * | 8/2012 | Parimi et al. | 585/240 |
| 8,247,632 B2 * | 8/2012 | Strege et al. | 585/733 |
| 2003/0093942 A1 | 5/2003 | Jordan | |
| 2003/0167681 A1 | 9/2003 | Delgado Puche | |
| 2004/0074760 A1 | 4/2004 | Portnoff et al. | |
| 2004/0231236 A1 | 11/2004 | May et al. | |
| 2005/0232956 A1 | 10/2005 | Bist et al. | |
| 2006/0024801 A1 | 2/2006 | Holtzapple et al. | |
| 2006/0236598 A1 | 10/2006 | Selvidge | |
| 2007/0014895 A1 | 1/2007 | Holtzapple et al. | |
| 2007/0039240 A1 | 2/2007 | Carroway | |
| 2007/0068848 A1 | 3/2007 | Monnier et al. | |
| 2007/0137097 A1 | 6/2007 | Ikura | |
| 2007/0144060 A1 | 6/2007 | Ikura | |
| 2007/0170091 A1 | 7/2007 | Monnier et al. | |
| 2008/0092436 A1 * | 4/2008 | Seames et al. | 44/308 |
| 2008/0229654 A1 | 9/2008 | Bradin | |

OTHER PUBLICATIONS

I. Lee, et al., "Use of Branched-Chain Esters to Reduce the Crystallization Temperature of Biodiesel", from JAOCS, vol. 72, No. 10, pp. 1155-1160 (1995).

S. P. R. Katikaneni, et al., "Catalytic Conversion of Canola Oil to Fuels and Chemicals Over Various Cracking Catalysts", from The Canadian Journal of Chemical Engineering, vol. 73, pp. 484-497 (1995).

M. S. Graboski, et al., "Combustion of Fat and Vegetable Oil Derived Fuels in Diesel Engines," from Prog. Energy Combust. Sci., vol. 24, pp. 125-164 (1998).

F. Ma, et al., "Biodiesel Production: A Review", from Bioresource Technology 70, pp. 1-15 (1999).

R. O. Dunn, "Alternative Jet Fuels From Vegetable Oils", from American Society of Agricultural Engineers, vol. 44, pp. 1751-1757 (2001).

Y. S. Ooi, et al., "Catalytic Conversion of Palm Oil-Based Fatty Acid Mixture to Liquid Fuel", from Biomass and Bioenergy 27, pp. 477-484 (2004).

E. Corporan, et al., "Impacts of Biodiesel on Pollutant Emissions of a JP-8-Fueled Turbine Engine", from Journal of the Air & Waste Management Assoc., vol. 55, pp. 940-949 (Jul. 2005).

S. M. Sadrameli, et al., "Systematics of Renewable Olefins From Thermal Cracking of Canola Oil," from J. Anal. Appl. Pyrolysis 78, pp. 445-451 (2007).

B. K. Bhaskara Rao, "Modern Petroleum Refining Processes", Oxford & IBH Publishing Co. Pvt. Ltd. (5th Ed. 2007) pp. 304-407.

"The Need for Leaded Avgas." EPI Inc. First published Feb. 28, 2008. Retrieved Apr. 28, 2010 from <http://www.epi-eng.com/aircraft_engine_products/demise_of_avgas.htm>.

Sadrameli, S.M. et al., "Modeling representations of canola oil catalytic cracking for the production of renewable aromatic hydrocarbons." Journal of Analytical and Applied Pyrolysis. 86. 2009. pp. 1-7. (Available online Mar. 10, 2008).

Katikaneni, Sai P. R. et al., "Catalytic Conversion of Canola Oil to Fuels and Chemicals Over Various Cracking Catalysts." The Canadian Journal of Chmical Engineering, vol. 73, Aug. 1995. pp. 484-497.

The extended European Search Report in counterpart European App. No. 09829474.7 filed Nov. 25, 2009.

\* cited by examiner

METHOD FOR PRODUCING CYCLIC ORGANIC COMPOUNDS FROM CROP OILS

CROSS-REFERENCE TO RELATED APPLICATION(S)

This application claims priority to U.S. Provisional Application No. 61/118,066, filed Nov. 26, 2008, the disclosure of which is incorporated by reference in its entirety.

STATEMENT OF GOVERNMENT INTEREST

The U.S. Government has a paid-up license in this invention and the right in limited circumstances to require the patent owner to license others on reasonable terms as provided for by the terms of Contract No. 61047 awarded by the Federal Aviation Administration.

BACKGROUND

One of the key challenges facing modern industrialized society is the rapid depletion of crude oil, which is the primary source for most transportation fuels and many organic chemicals. The petrochemical industry represents a substantial benefit to human society and the invention and commercialization of alternative sources for petrochemicals is of great importance.

One category of organic chemicals that is often produced from petroleum includes aromatics and cycloparaffins. These chemicals have a wide range of uses including serving as monomers for many types of polymers, paints, and coatings, serving as chemical intermediates for many types of industrial and consumer chemicals, and serving as valuable chemical components of heterogeneous transportation fuels such as gasoline, diesel, aviation gasoline, and jet fuel.

Surprisingly, very little work has been done to develop commercially-relevant products rich in aromatics and/or cycloparaffins generated from triacylglycerides (TAGs) and other fatty acids. Thus, a need exists to provide an alternative source for these chemicals so that demand can be satisfied as the available supply of source material, i.e., crude oil, is depleted.

SUMMARY

A method for producing chemical products containing cyclic organic compounds from biomass oil includes adding a biomass oil to a reactor vessel; heating the biomass oil to a temperature ranging from about 100° C. to about 800° C. for a time sufficient to crack the biomass oil; removing undesired materials, unreacted biomass oil, heavy ends, and light ends from the cracked biomass oil; and extracting components from the cracked biomass oil to produce a mixture of chemical products containing between 5% and 90% cyclic organic compounds by weight. The biomass oil is heated at a pressure between about vacuum conditions and about 2000 psia.

A method for producing a high-octane aviation fuel with low lead content includes heating a biomass oil to a temperature between about 100° C. and about 800° C. to crack the biomass oil, separating a middle distillate mixture from the cracked biomass oil, decarboxylating the middle distillate mixture to produce a mixture of chemical products containing at least about 50% cyclic alkane and alkene compounds by weight, and blending the mixture of chemical products with a fuel having an octane number below 95 to produce an aviation fuel having an octane number of at least 100. The biomass oil is heated at a pressure between about vacuum conditions and about 2000 psia. The middle distillate mixture contains at least about 50% cyclic organic compounds by weight. The aviation fuel contains lead at a concentration less than about 0.5 grams per liter.

DETAILED DESCRIPTION

Figure 1:
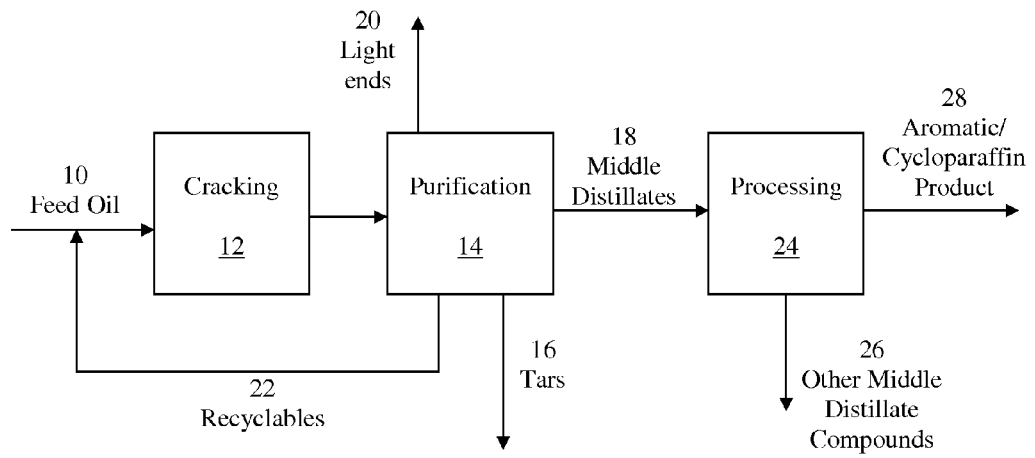
FIG. 1 is a simplified block flow diagram illustrating one embodiment of a cyclic organic compound production process.

Aromatic and cycloparaffin compounds can be produced from crop oils via chemical reaction using a zeolite-based, heterogeneous catalyst. The catalyst H-ZSM-5 (an aluminosilicate zeolite) generally produces more aromatic compounds than other catalysts according to experiments with canola and palm oils. However, the complex mixture of H-ZSM-5-catalyzed reaction products limits the suitability of its use for the production of other chemicals. Furthermore, the mixture of chemical reaction products produced by H-ZSM-5 is not useful for applications such as aviation gasoline or JP-8 jet fuel, as the mixture of products is a blend of gaseous, solid, aqueous liquid, and organic liquid material.

The present invention unexpectedly resolves the aforementioned problems. The integration of multiple processing steps creates valuable chemical products outside the scope of general crop oil processing. One example is the purification of aromatic compounds so that they can be converted into raw materials from which polymers can be made. Another example of additional processing steps creating new products from crop oils utilizes an additional chemical reaction in which aromatic compounds are reacted further with other products to produce alkylated aromatic compounds. These alkylated aromatic compounds exhibit properties that are desirable for both aviation gasoline and jet fuel, whereas the original aromatic compounds do not. An optional subsequent reaction can be employed to convert some or all of these alkylated aromatic compounds and other aromatic compounds into cycloparaffins, which have some unique properties compared to other compounds that make them desirable in aviation gasoline and jet fuel. A heterogeneous mixture of aromatic, cycloparaffinic, and other compounds can be produced that is suitable as an aromatics-rich blendstock that can be used to replace petroleum-based aromatics in conventional processes which generate aviation turbine fuels.

"Cyclic organic compounds" are chemical compounds containing one or more bonded ring of carbon atoms forming the backbone of the chemical compound. Cyclic organic compounds include aromatic compounds, such as benzene and toluene, cycloalkanes, such as cyclohexane and cyclodecane, and cycloparaffins. "Aromatics," "aromatic compounds" or "aromatic hydrocarbons" are hydrocarbons containing planar sets of six carbon atoms that are connected by delocalized electrons in a manner as if they were connected by alternating single and double covalent bonds. "Cycloparaffins" are alkanes with one or more rings of carbon atoms in the chemical structure of their molecules and generally have a total of 20 or more carbon atoms in the molecule.

Aromatic compounds include, but are not limited to: benzene, toluene, o-xylene, m-xylene, p-xylene, ethylbenzene, methyl benzene, ethyl methyl benzene, dimethyl benzene, trimethylbenzene, propyl benzene, methyl propyl benzene, tetramethyl benzene, cetyl butenyl benzene, and methyl propyl benzene. Aromatic compounds also include polyaromatics, such as naphthalene, methyl naphthalene, ethyl naphthalene, tetrahydro methyl naphthalene, and tetra hydro ethyl naphthalene. Cycloparaffins include, but are not limited to: cyclopentane, butyl cyclopentane, cyclohexane, methyl cyclohexane, ethyl cyclohexane, trimethyl cyclohexane, ethyl methyl cyclohexane, methyl propyl cyclohexane, butyl cyclohexane, propyl cyclohexane, pentyl cyclohexane, cyclodecane, dimethyl ethyl cyclodecane, heptylcyclohexane and octylcyclohexane.

Embodiments of the present invention are directed to the production and purification of products that contain cyclic organic compounds from plant oils, biologically generated lipids, and animal fats. Specifically, the feedstocks are triacylglycerides (TAGs), long chain fatty acids, long chain lipids, or similar chemicals. Embodiments of the present invention provide means to produce these valuable and necessary chemicals from feedstocks not currently utilized to produce these chemicals. The chemical modifications, based on the use of cracking, chemical reactions, and separation techniques, are designed to produce commercial-quality chemical products that can directly replace comparable chemical products generated from other feedstock sources and to produce fuel blendstocks that are advantageous because of their high concentration of cyclic organic compounds containing aromatic compounds and cycloparaffins. "Cracking" refers to any process that changes the chemical composition of an organic chemical or chemical mixture by cleaving one or more carbon-carbon bonds.

Research involved in TAGs and thermal and catalytic cracking (either individual TGs or vegetable oils) has occurred sporadically in the last few decades. From this work, a set of organic reactions has been identified as occurring during the thermal/catalytic cracking of TAGs as shown in Table 1.

TABLE 1

1. Thermolysis of the TG ester bond

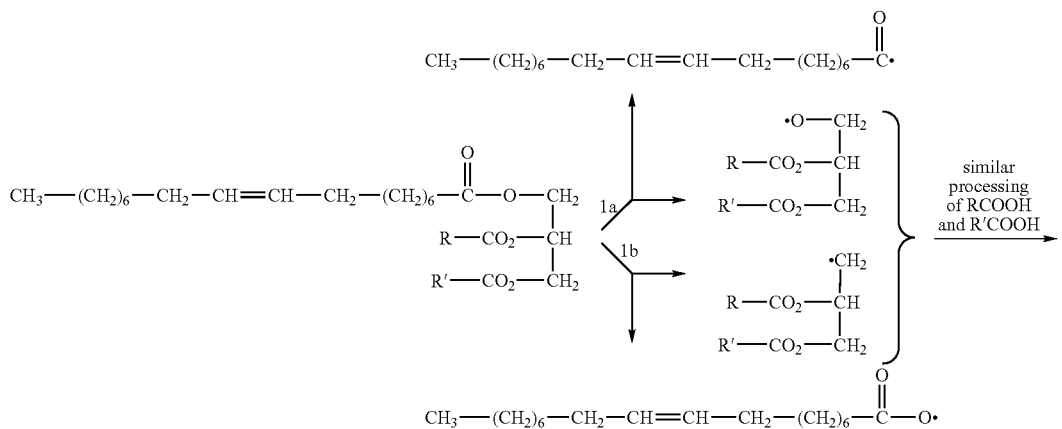

2. Deketenization (continuation of reaction 1a)

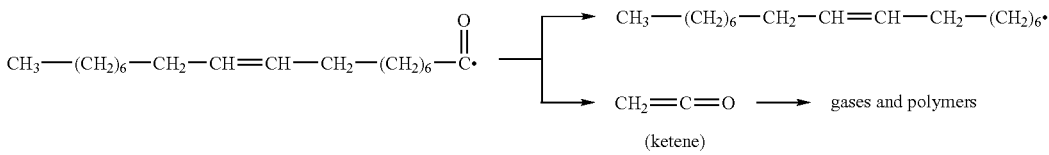

3. Decarboxylation (continuation of reaction 1a)

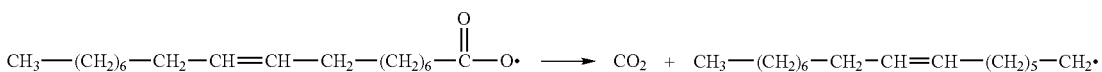

4. Stabilization of radicals

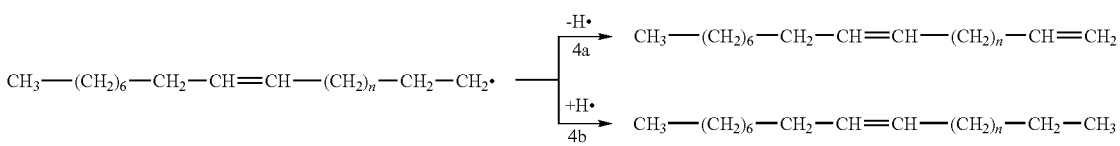

TABLE 1-continued

5. Cracking of unsaturated hydrocarbons (shown for the predominant allyl position)

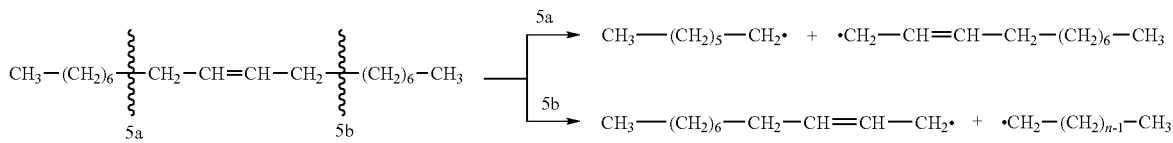

6. Isomerization
6a. Moving the double bond
$CH_3-(CH_2)_6-CH_2-CH=CH-CH_2-CH_2-(CH_2)_n-CH=CH_2 \rightarrow CH_3-(CH_2)_6-CH_2-CH=CH-CH=CH-(CH_2)_n-CH_2CH_3$
6b. Forming more stable radicals

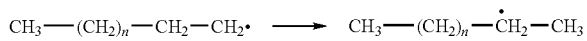

7. Formation of branched radicals
7a. Direct isomerization to form more stable radicals

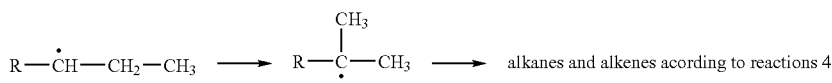

7b. Reactions of radicals with double bonds

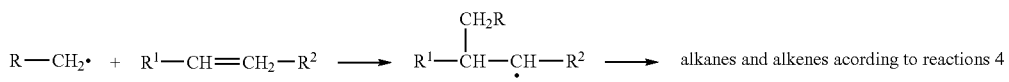

8. Diels-Alder reaction

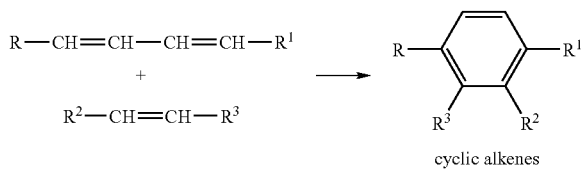

cyclic alkenes

9. Dehydrogenation and hydrogenation

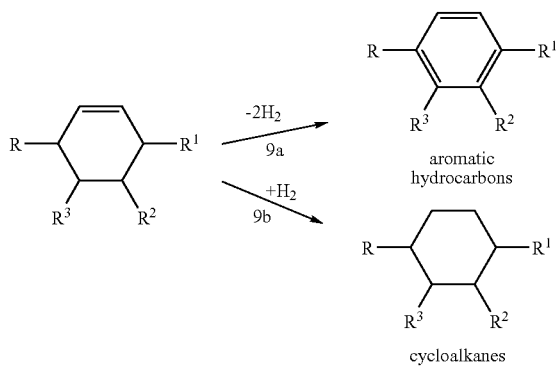

10. Termination
$R-CH_2\cdot + R^1-CH_2\cdot \rightarrow R-CH_2-CH_2-R^1$
Previously unknown or uncommon reactions TABLE 1-continued 11. Fatty acid cracking

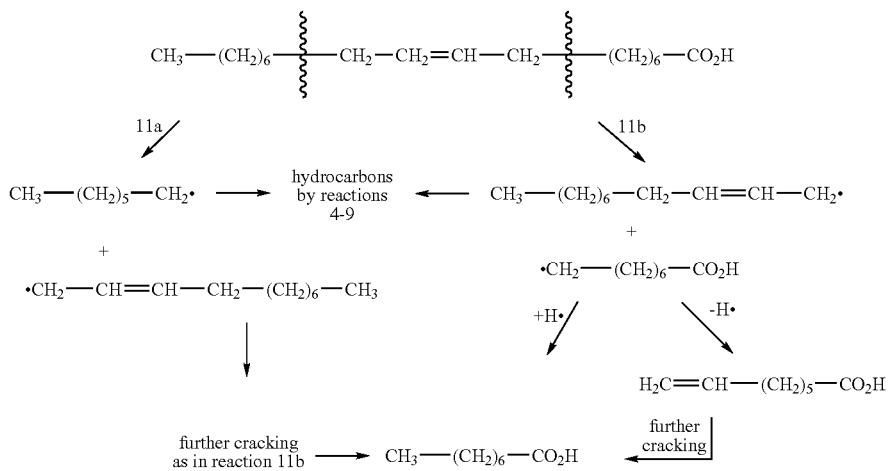

Depending upon the reaction conditions, such as temperature, pressure, reaction time, and the presence or absence of specific catalysts, different reaction product mixtures can be generated. Reaction product mixtures, known as "crackate," for three sets of previously documented reaction conditions, denoted as "routes," are summarized in Table 2.

TABLE 2

| | Cracking conditions | | |
|---|---|---|---|
| Products | Route 1[a] (piqui oil) 300° C. catalyzed % (w/w) | Route 2[b] (canola oil) 450° C. catalyzed % (w/w) | Route 3[c] (safflower oil, high in oleic acid) 300-360° C. non-catalyzed % (w/w) |
| Alkanes $C_3$-$C_5$ | 0 | | |
| Alkanes $C_6$-$C_{10}$ | 14.2 | | Some ($C_6$-$C_9$) |
| Alkanes $C_{11}$-$C_{16}$ | 25.3 | | Most ($C_{15}$-$C_{18}$) |
| Alkanes $C_{17}$-$C_{24}$ | 2.4 | | |
| Total linear alkanes | 41.9 | | Most |
| Total branched alkanes | 2.6 | | |
| Total identified alkanes | 44.5 | | 37.5 |
| Olefins $C_5$-$C_{10}$ | 12.0 | | |
| Olefins $C_{11}$-$C_{16}$ | 14.3 | | |
| Olefins $C_{17}$-$C_{20}$ | 0 | | |
| Dienes | 0 | | 8.1 |
| Total linear olefins | 26.3 | | Most |
| Total branched olefins | 1.3 | | |
| Total identified olefins | 27.6 | | 22* |
| Total identified aliphatic hydrocarbons | 72.1 | 7.2 | >57.5* |
| Total BTEX | 0 | 28.1 | Abundant |
| Other identified aromatics | 0 | 10.3 | |
| Total identified aromatics | 0 | 38.4 | 2.2 |
| Furanes and ketones | | 8.8 | |
| Alcohols and ketones | | 5.8 | |
| Fatty acids $C_2$-$C_3$ | 0 | | Traces |
| Fatty acids $C_4$-$C_9$ | 0 | | Some ($C_7$-$C_9$) |
| Fatty acids $C_{10}$-$C_{11}$ | 0 | | Traces except for C10 |
| Fatty acids $C_{16}$ | 0 | | Most (TG acids) |
| Total identified fatty acids | 0 | | 11.5 |
| Acids (unspecified) and esters | | 2.2 | |
| Total | 72.1 | 62.9 | 81.4 |

Where
[a]Route 1 is catalytic cracking at low temperature: Alencar, 1983; at 300° C.
[b]Route 2 is catalytic cracking at high temperature: Katikaneni, 1995; at 450° C.
[c]Route 3 is non-catalytic cracking at low temperature: Schwab, 1988; at 300-360° C.
*An additional 9.7-10.1% are listed as "unresolved unsaturates"

Route 2 shows a set of conditions which results in the formation of a high concentration of aromatic compounds. However, this crackate's composition is not useful for commercial applications in this form.

Applicants discovered that when crackate was generated using reaction conditions similar to those of Route 2 in Table 2 and then purified to remove light ends, recyclables, and tars, the resulting middle distillate contained between 5% and 50% cyclic organic compounds. Embodiments of the present invention use thermal or catalytic cracking technologies, coupled with separation technologies such as distillation, filtration, membrane filtration or separation, solvent extraction, and related technologies to produce high concentrations of cyclic organic compounds from TAGs and other fatty acids. In addition, certain products require additional subsequent chemical reactions. While cracking and separation techniques are known to those skilled in the art, the combination of these technologies has not been used to produce commercial quality cyclic organic compound fuel blendstocks or to produce commercial-quality purified aromatic and/or cyclo-paraffinic chemical products having between 5% and 90% cyclic organic compounds. Mixtures of aromatic compounds and cycloparaffin products can be produced wherein at least about 20%, 30% or 50% of the mixture is an aromatic compound and/or a cycloparaffin product.

Applicants further discovered that there is an economic advantage to further processing some or all of the aromatic compounds generated during the process. One of these subsequent processes utilizes reactions with olefins to produce additional, specific cycloparaffins. These reactions are coupled with separation technologies such as distillation, filtration, solvent extraction, and related technologies to produce commercial quality cycloparaffinic-rich heterogeneous fuel blendstocks or to produce commercial-quality purified cycloparaffinic chemical products. Another of these subsequent processes uses reactions with phosgene or other chemicals to produce specific derivative aromatic- or cycloparaffin-based chemicals. These reactions, coupled with separation technologies such as distillation, filtration, solvent extraction, and related technologies, are used to produce commercial quality chemical products.

The raw material for the processes presently disclosed can be any TAG, representing a group of chemical compounds that can be found in plant oils or biomass such as algae, or any medium and/or long chain fatty acids that are naturally synthesized and found in biomass such as algae, animal fats, or modified materials. "Biomass" refers to any organic, non-fossil material that is derived from the mass of any biological organism excluding mass that has been transformed by geological processes in substances such as coal or petroleum. "Biomass oil" refers to any oil derived from a biomass source. The TAGs in plant oils consist of three medium and/or long chain fatty (naturally synthesized carboxylic) acids connected via a glycerol group. These medium and/or long chain fatty acids, can be purified, separated, and chemically modified for use as a food source or chemical feedstock or as a potential transportation fuel. "Long chain fatty acids" refer to fatty acid chains containing at least fifteen carbon atoms. "Medium chain fatty acids" refer to fatty acid chains containing ten to fourteen carbon atoms.

"Plant oil" refers to lipids that are derived from plant sources. Plant oils include, but are not limited to, cottonseed, flaxseed, soybean, safflower, sunflower, sesame, canola, rapeseed, jatropha, jojoba, evening primrose, poppy, camelina, crambe, olive, coconut, palm, cotton, corn, soybean, and nuts. Compositions of major commercially available crop oils are listed in Table 3. Typical fatty acids contained in crop oils include saturated and unsaturated fatty acids. Saturated fatty acids do not contain any double bonds between carbon atoms. Unsaturated fatty acids contain two or more carbon atoms having a carbon-carbon double bond. Saturated acids include stearic acid, palmitic acid, myristic acid, and lauric acid. Unsaturated acids include linolenic acid, linoleic acid, oleic acid, hexadecanoic acid, palmitoleic acid, and myristoleic acid.

TABLE 3

| Crop | | Polyunsaturated % | | | Mono % | Saturated % | | |
|---|---|---|---|---|---|---|---|---|
| Name | Lipid % | 18:3 | 18.2 | 22:1 | 18:1 | 18:0 | 16:0 | Total |
| Corn | 4 | — | 59 | — | 24 | 17 | — | 17 |
| Crambe | 26-38 | 5 | 9 | 55-60 | 17 | — | — | 3 |
| Flax | 35 | 58 | 14 | — | 19 | 4 | 5 | 9 |
| Soybean | 20 | 7 | 50 | — | 26 | 3 | 12 | 15 |
| Mid-Oleic Soybean | 20 | 0.5 | 28 | — | 60 | 4 | 9 | 13 |

TABLE 3-continued

| Crop | | Polyunsaturated % | | | Mono % | Saturated % | | |
|---|---|---|---|---|---|---|---|---|
| Name | Lipid % | 18:3 | 18.2 | 22:1 | 18:1 | 18:0 | 16:0 | Total |
| Safflower | 59 | — | 75 | — | 13 | 12 | — | 12 |
| Sunflower | 47 | — | 74 | — | 23 | 3-4 | 7 | 10-11 |
| NuSun Sunflower | 45-50 | — | 15-35 | — | 50-75 | 3-4 | 4-5 | 7-9 |
| High Oleic Sunflower | 45-50 | — | 7 | — | 83 | 4 | 5 | 9 |
| Primrose | 17 | — | 81 | — | 11 | 2 | 6 | 8 |
| Sesame | 49.1 | — | 45 | — | 42 | 13 | — | 13 |
| Canola | 30-35 | 8 | 22 | 1 | 64 | 3 | 1 | 4 |
| Rapeseed | 30-35 | 8 | 22 | 30-45 | 19 | 4 | 1 | 5 |
| Olive | 20 | — | 8 | — | 75 | 16 | — | 16 |
| Coconut | 35 | — | 3 | — | 6 | — | 91 | 91 |
| Palm | 35 | — | 2 | — | 13 | — | 85 | 85 |
| Camelina | 31 | 31.2 | 23.1 | 2.8 | 16.8 | 3.0 | 7.8 | 10.8 |

Thermal and catalytic cracking of medium and/or long chain fatty acids, coupled with separation and purification technologies, are known in the art and can produce a mixture of chemicals suitable for use as a fuel or a fuel blendstock, most specifically as components in diesel, kerosene, aviation turbine, and motor gasoline fuels. "Thermal cracking" refers to a cracking process that involves the addition of energy in the form of thermal energy as measured by an increase in the temperature of the substance being cracked. "Catalytic cracking" refers to a cracking process that uses a catalyst.

In the cracking process, energy is used to break carbon-carbon bonds. Each carbon atom ends up with a single electron and free radicals. Any reactions of the free radicals can lead to various products as shown in Table 1. The breaking of large organic molecules into smaller and more useful molecules can be achieved by using high pressures and/or high temperatures with a catalyst (catalytic cracking) or without (thermal cracking). It has been shown that medium (ten to fourteen carbons) and long (greater than sixteen carbons) chain fatty acids are compatible with cracking processes, using either thermal or catalytic cracking. These techniques have been used to modify the chemical composition of crop oils or biodiesel. However, they have not been used to produce commercial-quality cyclic organic compounds.

The production of aromatic compounds from TAGs and fatty acids using thermal or catalytic cracking has been previously described, but the prior art fails to identify a complete series of process steps that takes the aromatic compounds and/or cycloparaffins generated during cracking and subsequently produces commercially-viable products. Embodiments of the present invention allow a crop oil, biologically generated lipid, or animal fat oil feedstock to be converted into these important and valuable chemical products. The present invention utilizes separation and chemical reaction technologies, coupled with thermal and/or catalytic cracking techniques in order to develop crop oil-, biologically generated lipid-, or animal fat-based chemicals that can replace commercially available chemicals generated from other feedstock sources and to develop heterogeneous cyclic organic compound-rich fuel blendstocks.

FIG. 1 depicts a simplified block flow diagram illustrating one embodiment of a cracking and aromatization process according to the present invention. Raw material 10 is a crop oil, lipid, or animal fat feedstock and may be produced by processes now available or that may be developed in the future. Raw material 10 may be preheated or directly fed into a suitable vessel (cracking reactor) to facilitate cracking reaction 12. By varying the time, temperature, and pressure under which a particular feedstock remains under cracking conditions, the desired degree of cracking (conversion) can be controlled. Temperature and time (residence time) are the more important process variables with pressure playing a secondary role. Cracking reaction 12 can be performed between about 100° C. and about 800° C., and at pressure ranging from about vacuum conditions to about 2000 psia. More preferably, cracking reaction 12 is performed between about 300° C. and about 700° C. Conditions are preferably maintained for a time sufficient for raw material 10 to be cracked, and typically range from about 15 minutes to about 500 minutes or more. Times shorter than 5 minutes and longer than 500 minutes can be suitable for cracking reactions of some feedstocks.

The products resulting from cracking reaction 12 are dependent upon the cracking conditions and the original composition of raw material 10 (feed oil, for example) and the gaseous environment present in the cracking reactor. The cracking conditions can be varied based on detailed chemical analyses in order to produce an optimal mixture of chemical components. A catalyst can be used in the cracking reactor to (1) improve the yield of desirable products, especially aromatic compounds; (2) decrease the formation of unwanted products; and/or (3) increase the efficiency of cracking reaction 12 due to lower pressure, temperature, or residence time requirements. Suitable catalysts include, but are not limited to, activated alumina, silica-alumina, aluminum, zeolites, sulfated metal oxides, rare metals such as palladium, niobium, molybdenum, platinum, titanium, cobalt, gold and combinations thereof.

The cracking output (crackate) is subjected to purification and/or processing step 14 depending upon the material generated. The output from the cracking reactor depends upon the specific reactor design employed. Suitable reactor types include batch, continuous flow through, flow through packed bed, and fluidized bed. Material generated in the cracking reactor can generally be classified in one of four general classes: residual materials or residue 16, middle distillates 18, light ends 20 and unreacted raw materials 22. Purification and/or processing step 14 can include separating residual materials or residue 16, middle distillates 18, light ends 20 and unreacted raw materials 22;

Residual material or residue (tars) 16 includes chemicals produced during cracking reaction 12 that have a higher molecular weight, lower volatility or lower heating value than is desirable for middle distillates 18. Some residue 16 can be separated from middle distillates 18 along with unreacted raw materials 22 and processed along with unreacted raw materials 22. Other residues 16, typically those of higher molecular weight, will be in the form of solid material after cracking reaction 12. These compounds are typically known as "tars." "Tars" refers to very long chain chemical compounds generated during the cracking reaction. Tars 16 can contain valuable chemical compounds, such as boiler fuel or other by-products that can be extracted by various processing methods including solvent extraction or distillation. Depending upon the design of the cracking reactor, tars 16 may not be amenable to further processing. These tars 16 can be oxidized, combusted or otherwise removed from the cracking reactor or cracking catalysts by methods known to those skilled in the art.

Middle distillate components 18 are a mixture of aromatic compounds, cycloparaffinic compounds, short chain carboxylic acid compounds, linear paraffinic compounds, olefins, and other components generated in the cracking reactor that have desirable properties and include the primary products that the process is designed to generate. "Middle distillates" refers to chemicals which have properties amenable for inclusion in a gasoline, kerosene, or diesel type fuel or which have a volatility similar to those paraffins and/or olefins which are amenable for inclusion in a gasoline, kerosene, or diesel type fuel.

"Light ends" refers to chemicals which stay in the gaseous phase at conditions of temperature and pressure at which middle distillates are in the liquid phase. Light ends 20 include unreacted vapor-phase material that was added to the reactor to manipulate cracking reaction 12, such as hydrogen, nitrogen, or water vapor, in addition to low molecular weight organic chemicals and hydrocarbons generated by cracking reaction 12. Low molecular weight organic chemicals and hydrocarbons, such as methane, methanol, ethane, ethanol, n-pentane, i-pentane, pentene, pentanol n-butane, i-butane, butanol, butane, methyl ester, ethyl ester, etc., have chemical and physical properties (e.g., volatility) that are undesirable when present in substantial concentrations in mixtures of aromatic compounds and other middle distillates 18. Light ends 20 are separated from the other material that exits the cracking reactor by gas-liquid phase separation, distillation, condensation, or other processes.

Unreacted raw materials 22 are chemicals that enter the cracking reactor and undergo cracking reaction 12, but are not converted to chemical compounds with carbon chains shorter than C16. "Unreacted raw materials" are those compounds in the cracking reactor product stream that have a chemical composition that is not amenable as a middle distillate component and can be exposed to cracking reactor conditions and transformed into middle distillate and/or light ends and/or tars. These compounds may be chemically identical to the originating oil, a fatty acid whose length is identical or similar to the fatty acid chains on the original TAG, when TAGs are in the feedstock oil, or a partially cracked paraffin, olefin, or carboxylic acid that has too many carbon atoms in the primary carbon chain to be amenable as a middle distillate blend component. These materials have some undesirable chemical and physical properties. Unreacted raw materials 22 are separated from middle distillates 18 by distillation or other separation techniques. Unreacted or uncracked raw materials 22 can be returned to the cracking reactor for additional cracking reactions 12, fed to a second cracking reactor or utilized for some other purpose.

Subsequent purification and/or processing step 24 of middle distillates 18 depends upon the products desired for the specific application. Purification and/or processing step 24 can include solvent extraction, distillation, chemical reaction and combinations thereof. Subjecting cyclic organic compounds contained in middle distillates 18 to additional purification and/or processing step 24 yields additional middle distillates 26 as well as the desired aromatic compounds or cycloparaffin end products 28. End products 28 can include aromatic compounds and cycloparaffins for use as fuel blendstocks or commercial grade chemicals. Undesired materials (not shown in FIG. 1) can be removed during purification and/or processing step 24 in addition to additional middle distillates 26. Undesired materials include solvents used in purification and/or processing steps 14 and/or 24 and other chemical compounds not desirable in end product 28.

A series of examples are described to demonstrate ways that the present invention can be utilized. These represent typical examples and are not an exhaustive list of all of the various options and applications for which the present invention can be utilized. Rather, the examples represent typical examples of the general classes of applications currently anticipated for the present invention.

Example 1

Generating an Enhanced Octane Blendstock Stream for Aviation Gasoline

Figure 2:
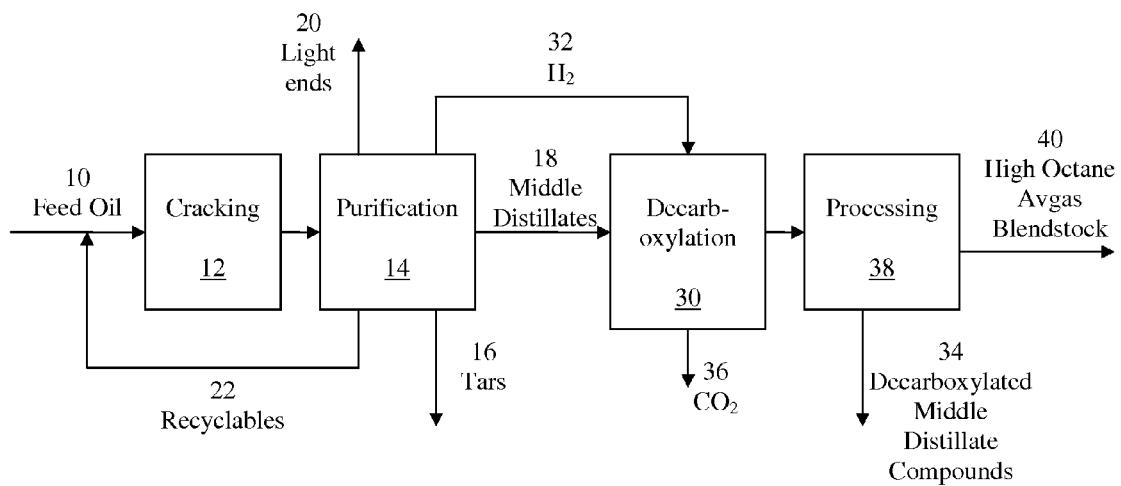
FIG. 2 is a simplified block flow diagram illustrating one embodiment of a process for producing an enhanced octane blendstock stream for aviation gasoline.

One embodiment of the present invention produces an octane enhancer for aviation gasoline and is illustrated in FIG. 2. The octane enhancer can be mixed with a primary fuel stream (kerosene, biodiesel or fuel blendstock) to produce a fuel mixture that can meet the requirements needed for aviation gasoline (ASTM International Test Method (ASTM) D 910-04a). Raw material 10 undergoes cracking reactions 12 and purification and/or processing step 14 as described above and illustrated in FIG. 1. The resulting middle distillates 18 contain approximately 50% aromatic compounds by weight.

Middle distillates 18 are subjected to decarboxylation 30 in order to convert fatty acids to alkanes. The hydrogen 32 needed for decarboxylation 30 is recovered directly from light ends 20 obtained during purification and/or processing step 14. Optionally, light ends 20 can be reacted with carbon monoxide and/or methane (not shown) before the collection and introduction of hydrogen 32 to facilitate decarboxylation 30. Decarboxylation 30 yields decarboxylated middle distillates 34 and carbon dioxide 36. Further enrichment of the targeted cyclic organic compounds can be accomplished by additional processing step 38 of the decarboxylated middle distillates as desired to meet the specifications of end product 40, which includes high octane aviation gasoline blendstock. Processing step 38 can include solvent extraction, distillation, chemical reaction and combinations thereof.

A typical composition for end product 40 (high octane aviation gasoline blendstock) is shown in Table 4.

TABLE 4

| Component | Vol (%) |
| --- | --- |
| Cycloparaffins | 37.5 |
| Dicycloparaffins | 14.75 |
| Tricycloparaffins | <2.5 |
| Alkylbenzene | 30 |
| Indanes & tetralins | 15.75 |
| Indenes & $C_nH_{2n-10}$ | <1.25 |
| Naphthalene | <1.25 |
| Naphthalenes | 3 |
| Acenaphthelenes | <1.25 |
| Acenaphthylenes | <1.25 |
| Tricyclic Aromatics | <1.25 |
| Total | 100 |

High octane aviation gasoline blendstock end product 40 has a research octane number of 123. End product 40 can be blended with a fuel to produce a blended fuel with a higher octane rating than the fuel itself. For example, blending high octane aviation gasoline blendstock end product 40 having an octane number of 123 and 91-octane gasoline at a ratio of 3:7 yields a 100-octane aviation gasoline. Blending can be accomplished via conventional means.

Cyclic organic compounds such as end product 40 may be blended with a primary fuel stream such that the resulting octane number is at least two octane units higher than that of the primary fuel stream. Suitable primary fuel streams include alkylate (gasoline without additives), aviation gasoline blendstock, finished aviation gasoline product, motor gasoline blendstock, and finished motor gasoline product.

The 100-octane aviation gasoline example described above will have a lead content lower than that of 100LL aviation gasoline. 100LL aviation gasoline normally contains tetraethyl lead (TEL). Maximum lead content for 100LL aviation gasoline is 0.56 grams per liter (2 grams per U.S. gallon). End product 40 can be produced and blended with conventional aviation gasoline to provide a 100-octane aviation gasoline containing significantly lower maximum levels of lead (less than about 0.39 grams per liter) than 100LL aviation gasoline. End product 40 can also be blended with an aviation gasoline having a lead content higher than the allowable limit to produce a fuel product that conforms to lead content limits (by diluting the lead content). Such a fuel product can be produced having a lead content of about 0.5 grams per liter or lower. According to the present invention, a heterogeneous mixture of aromatic, cycloparaffinic, and other compounds can be produced that is suitable as a high-octane blendstock that can be used to replace some or all of the TEL currently added to conventional 100-octane aviation gasoline products.

Lab-scale experiments were performed to generate crackate rich in cyclic organic compounds required for the process. In these experiments, soybean oil was fed to a small cracking reactor and heated over an H-ZSM-5 catalyst to a reaction temperature of 400° C. for 80 minutes. The overall goal of these experiments was to produce an aromatic-rich octane enhancer for aviation gasoline. The aromatic compounds produced from the cracking reaction were identified and quantified. In the analysis, concentrations (% w/w) of all individual components were calculated and then summarized by adding them together under various chemical classes (linear-, iso-, and cyclo-alkanes; linear- and branch-alkenes; BTEX (benzene, toluene, ethyl benzenes, and xylenes); other aromatics; fatty acids; and the total determined fraction). Table 5 illustrates typical crackate compositions of BTEX, total aromatics, total fatty acids, and total determined/undetermined fractions of the crackate after cracking reaction 12. As shown, 70% of the crackate produced were aromatic compounds.

TABLE 5

| | Catalyst Zn-ZSM-5 Sample No. SB101-25-1 |
| --- | --- |
| Crackate (% w/w) | 22 |
| Total BTEX (% w/w of crackate) | 52 |
| Total ARs (% w/w of crackate) | 70 |
| Total FAs (% w/w of crackate) | 0 |
| Total determined (% w/w of crackate) | 82 |
| Total undetermined (% w/w of crackate) | 18 |

Where
BTEX includes benzene, toluene, ethyl benzenes, and xylenes
ARs are aromatic compounds
FAs are fatty acids

Example 2

Generating a Cyclic Organic Compounds Blendstock Stream for Jet Fuel

Figure 3:
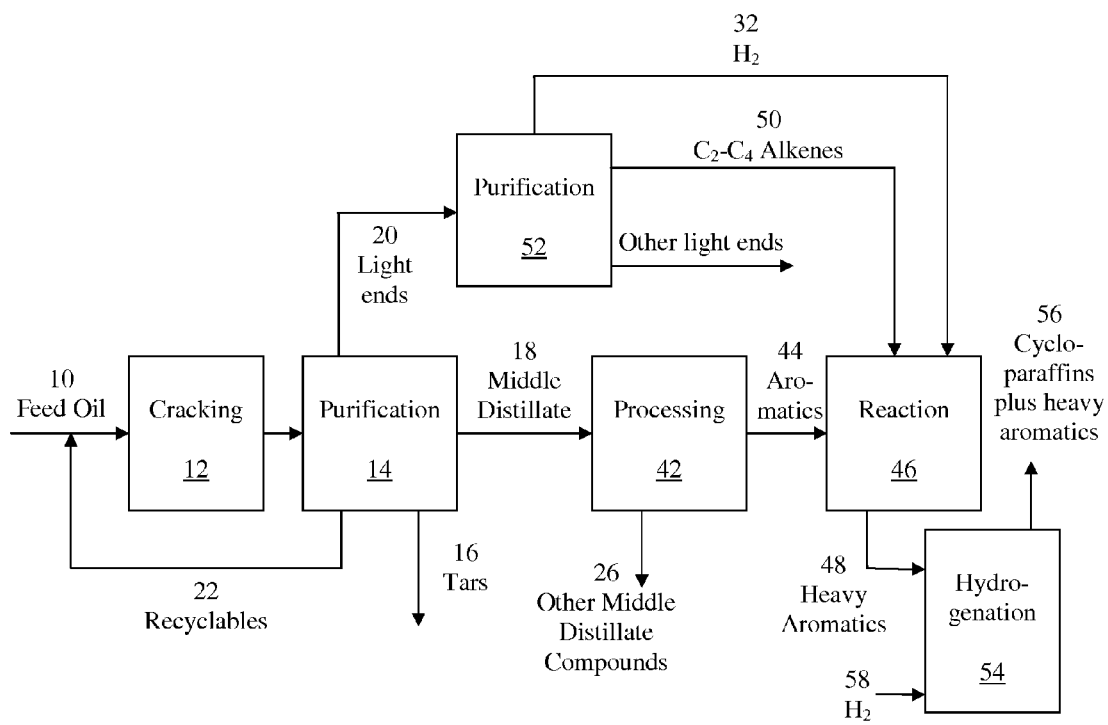
FIG. 3 is a simplified block flow diagram illustrating one embodiment of a process for producing heavy aromatic and cycloparaffin compounds.

One embodiment of the present invention that produces a high aromatics jet fuel blendstock is illustrated in FIG. 3. This cyclic organic compound blendstock can be subsequently blended with synthetic paraffinic kerosene produced from other sources, including crop oils or coal, to produce a fuel mixture that can meet the requirements needed for JetA (ASTM D 1655-09), JP-8 (MIL-DTL-83133), JP-4 (MIL- DTL-5624 U) or JP-5 (MIL-DTL-5624U). Raw material 10 undergoes cracking reactions 12 and purification and/or processing step 14 as described above and illustrated in FIG. 1. The resulting middle distillates 18 contain approximately 50% aromatic compounds by weight.

Jet fuel has both minimum and maximum specifications for aromatic compounds. In order to make the most commercially valuable jet fuel blendstock, middle distillates 18 are subjected to second purification 42. Second purification 42 produces products that are capable of separation, including aromatics 44 and other middle distillates 26. Some aromatics 44 are converted via alkylation reactions 46 into heavy aromatics 48. Under certain conditions cracking reaction 12 generates approximately 5% two-to-four-carbon ($C_2$-$C_4$) olefins 50 which end up in light end fraction 20. These olefins 50

The key reactions in the process depicted in FIG. 3 involve the alkylation of various aromatics produced during cracking reaction 12 and purification 42. To verify these key reactions experimentally, the primary aromatics 44 produced during cracking reaction 12 and purification 42 were reacted individually and in blends. Table 6 shows the conversion, product identities, and selectivities for the following liquid-phase alkylations, carried out in autoclaves:

Individual aromatics (benzene, toluene, o-, m-, and p-xylene)

A BTEX blend that matched the expected cracking/aromatization effluent

The aromatic-rich middle distillates produced from cracking of soybean oil over H-ZSM-5 and subsequent purification.

TABLE 6

| Reaction Time (min) | Aromatic Compound | Aromatic/Alkene ratio | Alkene Conversion (%) | Product (% selectivity) |
|---|---|---|---|---|
| 30 | Benzene | 50 | 20 | cumene (100%) |
| 60 | Benzene | 10 | 30 | cumene (100%) |
| 60 | Benzene | 50 | 40 | cumene (100%) |
| 60 | Benzene | 1 | 70 | cumene (100%) |
| 60 | Benzene | 15 | 100 | cumene (100%) |
| 5 | Toluene | 1 | 50 | cymenes (3 isomers) (100%) |
| 10 | Toluene | 20 | 100 | cymenes (3 isomers) (100%) |
| 30 | Toluene | 10 | 100 | cymenes (3 isomers) (100%) |
| 60 | Toluene | 80 | 100 | cymenes (3 isomers) (100%) |
| 60 | Toluene | 10 | 10 | cymenes (3 isomers) (100%) |
| 60 | Toluene | 10 | 100 | cymenes (3 isomers) (100%) |
| 5 | m-xylene | 70 | 10 | 1,3-dimethyl-x-isopropyl-benzene (2 isomers) (100%) |
| 10 | m-xylene | 10 | 30 | 1,3-dimethyl-x-isopropyl-benzene (2 isomers) (100%) |
| 30 | m-xylene | 10 | 50 | 1,3-dimethyl-x-isopropyl-benzene (2 isomers) (100%) |
| 60 | m-xylene | 10 | 75 | 1,3-dimethyl-x-isopropyl-benzene (2 isomers) (100%) |
| 60 | p-xylene | 10 | 100 | 1,4-dimethyl-2-(1-isopropyl)benzene (100%) |
| 60 | o-xylene | 70 | 100 | 1,4-dimethyl-2-(1-isopropyl)benzene (100%) |
| 60 | BTEX-mix | 20 | 50 | cumene (20%), cymenes (40%), isopropyl xylenes (40%) |
| 60 | BTEX-mix | 10 | 100 | cumene (20%), cymenes (40%), isopropyl xylenes (40%) |
| 60 | BTEX-Crackate from soybean oil cracking & aromatization | 5 | 50 | cumene, cymenes, isopropyl xylenes |

Where
Autoclave volumes ranged from 300 mL to 1000 mL
Reaction Temperature was 150° C.
Reaction Pressure was 500 psig
Cymenes are 1-methyl-x-(1-methylethyl)benzene and their isomers
Isopropyl xylenes are xylenes alkylated with one isopropyl group may be extracted from light ends 20 in purification step 52 and used in alkylation reactions 46. Alkylation conversion reactions 46 may also utilize an external source of ethylene, propylene, or butylene (not shown), with or without olefins 50 extracted from light ends 20.

Heavy aromatics 48 may be further converted via hydrogenation 54 into cycloparaffins 56. The hydrogen 58 required for hydrogenation 54 may be recovered from light ends fraction 20. Optionally, light ends 20 may be first reacted with carbon monoxide and/or methane (not shown) before the extraction and introduction of hydrogen 58 to facilitate hydrogenation 54. One or both hydrogen sources 32 and 58 can be introduced for hydrogenation 54.

Propene was selected as a model alkene for alkylation reactions 46 because it is produced abundantly during cracking reaction 12 and purification and/or processing step 14. Other alkenes, such as ethene and butene, are also active alkylating agents for aromatics and will likely behave similar to propene. Hydrogen, ethylene, butylenes and other olefins, can generate specific cycloparaffins such as methylcyclohexane; ethylcyclohexane; propylcyclohexane, butylcyclohexane, and all combinations of methyl-, ethyl-, propyl-, butyl-, and pental-cyclohexanes such as 1,3-dimethylcyclohexane, 1-methyl-2-ethylcyclohexane, 1-methyl-2-ethyl cyclohexane, 1,3,5-trimethylcyclohexane, and 1,3,5-triethylcyclohexane. Aromatic compounds can also be reacted with other chemicals, such as hydrogen, ethylene, propylene, and/or butylene, to generate cumene, toluene, all xylenes, ethylbenzene, n- and isopropyl-benzene, n- and isobutyl-benzene, 1,2-dimethylbenzene (o-xylene); 1-methyl-3-ethylbenzene; 1-methyl-3-propylbenzene; 1,3-diisopropylbenzene; (1-methylethyl)benzene; 1,3-bis(1-methylethyl)benzene; 1-methyl-2-(1-methylethyl)benzene; 1-methyl-3-(1-methylethyl)benzene; 1-methyl-4-(1-methylethyl)benzene; 2-ethyl-1,3-dimethylbenzene; 1,2,4,5-tetramethylbenzene; 1,2-dimethyl-3-(1-methylethyl)benzene; 1,2-dimethyl-4-(1-methylethyl)benzene; 1-ethyl-4-(1-methylethyl)benzene; 2,4-dimethyl-1-(1-methylethyl)benzene; 1,3-dimethyl-5-(1-methylethyl)benzene; 1,2,3,4,5-pentamethylbenzene; 1-ethyl-2,4,5-trimethylbenzene; 1,4-dimethyl-2-(1-methylethyl)benzene; and 1-ethyl-4-(1-methylethyl)benzene.

Referring to Table 6:
From the alkylation of benzene, the reaction products identified were all expected. Alkylation of benzene with propene formed cumene with approximately 100% selectivity. At 150° C., the reaction reached high propene conversion after 60 minutes.

From the alkylation of toluene, the rate of alkylation of toluene was greater than that of benzene, reaching 90% conversion in less than 10 minutes. Alkylation of toluene with propene formed cymenes (isopropyl toluene) with approximately 100% selectivity.

From the alkylation of xylenes, the alkylations of both o- and p-xylenes were essentially complete after 60 minutes and produced the expected product mix composed of isopropyl groups at two ring positions for o-xylene and a single "isopropyl xylene" for p-xylene.

From the alkylation of a simulated BTEX mix, the BTEX mix reacted to form cumene (from benzene), cymenes (from toluene), and isopropyl xylenes. All products were in the $C_9$-$C_{11}$ region, which produces the desirable density, flash point, and freeze point of a jet-fuel blendstock. For example, o- and p-cymene have nearly identical flash and freeze points of 47° C. and −70° C., respectively. The scaled-up process is expected to contain aromatics up to $C_{14}$ due to polyalkylation.

From the alkylation of aromatic-rich middle distillates 44 from cracking reaction 12 and purification and/or processing step 14 and processing step 42, the alkylation of aromatic-rich middle distillates 44 led to the formation of cumene, cymene, and isopropyl xylenes as products formed by alkylation of benzene, toluene, and xylenes, respectively. Around 50% of the propene used for alkylation was consumed by the benzene, toluene, and xylenes with the rest of the consumption due to the alkylation of other aromatic compounds 44 present. Applicants concluded that the reaction was not significantly inhibited by other components. These results indicate that the BTEX compounds in middle distillate product 44 obtained through cracking reaction 12 and purification and/or processing step 14 and processing step 42 can be alkylated directly (step 46) without an intermediate purification step.

Example 3

Generating a Commercial Grade Benzene & Aromatic-Rich Blendstock for Jet Fuel

Another embodiment of the present invention produces commercial-quality benzene. The benzene end product can meet the purity requirements needed for Refined Benzene-545 per ASTM D 4734-04 (99.9% benzene by weight per ASTM D 4492). Raw material 10 undergoes cracking and purification essentially as described above and illustrated in FIG. 1. The resulting middle distillates 18 contain approximately 50% aromatic compounds.

Middle distillates 18 are subjected to purification step 14. Purification step 14 separates middle distillates 18 from light ends 20, recyclables 22, and tars 16. Benzene is isolated from middle distillates 18 in second purification step 24. Second purification step 24 includes extractive distillation and/or other purification methods to produce commercial-quality benzene as aromatic compounds or cycloparaffin end product 28. Selected aromatic compounds, such as benzene and/or toluene, can be isolated from the cracked biomass oil and purified to a product that satisfies current relevant commercial grade chemical specifications. These aromatic compounds can be further reacted with other chemicals, including but not limited to phosgene, to generate valuable chemical intermediates such as methylene diphenyl diisocyanate (MDI) and/or toluene diisocyanate (TDI).

Other embodiments of the present invention produce other commercial-quality cyclic organic compounds, such as toluene, cumene (isopropylbenzene), ethylbenzene, o-xylene and xylenes for p-xylene feedstock. Toluene end product can meet the purity requirements needed for Toluene Diisocyanate (TDI) Feedstock per ASTM D 5606-01 (99.9% toluene by weight per ASTM D 2360 or D 6526). Cumene end product can meet the purity requirements needed for Cumene per ASTM D 4077-00 (99.92% cumene by weight per ASTM D 3760). Ethylbenzene end product can meet the purity requirements needed for Ethylbenzene per ASTM D 3193-96 (99.00% ethylbenzene by weight per ASTM D 5060). O-xylene end product can meet the purity requirements needed for O-Xylene 980 per ASTM D 5471-97 (98.0% o-xylene by weight per ASTM D 3797). Xylene end products can meet the purity requirements needed for Xylenes for p-Xylene Feedstock per ASTM D 5211-01 (18% p-xylene, minimum, and 20% ethylbenzene, maximum, by weight per ASTM D 2306).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:
1. A method for producing chemical products containing cyclic organic compounds from biomass oil, the method comprising:
adding a biomass oil to a reactor vessel;
cracking the biomass oil at a temperature ranging from about 100° C. to about 800° C. at a pressure ranging from vacuum conditions to about 2000 psia for a time sufficient to crack the biomass oil;
removing undesired materials, unreacted biomass oil, heavy ends, and light ends from the cracked biomass oil; and
extracting components from the cracked biomass oil to produce a mixture of chemical products containing between 5% and 90% cyclic organic compounds by weight.

2. The method of claim 1, further comprising:
reacting the cracked biomass oil to add functional groups to the cracked biomass oil before extracting components from the cracked biomass oil.

3. The method of claim 1, wherein the cyclic organic compounds are aromatic and cycloparaffin compounds.

4. The method of claim 1, wherein the mixture of chemical products contains 20% or more cyclic organic compounds.

5. The method of claim 4, wherein the mixture of chemical products contains 30% or more cyclic organic compounds.

6. The method of claim 5, wherein the mixture of chemical products contains 50% or more cyclic organic compounds.

7. The method of claim 1, wherein reacting the cracked biomass oil is selected from the group consisting of decarboxylation, alkylation, hydrogenation and combinations thereof.

8. The method of claim 1, wherein extracting components from the cracked biomass oil is selected from the group consisting of solvent extraction, distillation, evaporation, membrane separation, chemical reaction and combinations thereof.

9. The method of claim 1, wherein the biomass oil is selected from a group consisting of plant oil, biologically generated lipid, animal fat and combinations thereof.

10. The method of claim 9, wherein the plant oil is selected from a group consisting of soybean oil, canola oil, palm oil, sunflower oil, corn oil, flaxseed oil, jatropha oil, jojoba oil, cottonseed oil, safflower oil, crambe oil, evening primrose oil, sesame oil, rapeseed oil, olive oil, coconut oil, camelina, and combinations thereof.

11. The method of claim 1, wherein the biomass oil is cracked at a temperature between about 300° C. and about 700° C.

12. The method of claim 1, wherein the biomass oil is heated cracked for a time ranging from about 5 minutes to about 500 minutes.

13. The method of claim 1, wherein the biomass oil is cracked in a gaseous environment.

14. The method of claim 13, wherein the gaseous environment is selected from the group consisting of an inert gas, nitrogen, water vapor, hydrogen, a mixture of vapor-phase organic chemicals and combinations thereof.

15. The method of claim 1, further comprising:
adding a catalyst to the reactor vessel before cracking the biomass oil.

16. The method of claim 15, wherein the catalyst is selected from the group consisting of alumina, silica-alumina, sulfated metal oxides, zeolites, palladium, niobium, molybdenum, platinum, titanium, aluminum, cobalt, gold, and combinations thereof.

17. The method of claim 1, wherein the reactor vessel is of a type selected from the group consisting of batch, continuous flow through, slurry, flow through packed bed, and fluidized bed.

18. The method of claim 1, wherein the cyclic organic compounds are blended with a primary fuel stream having a first octane number to produce a fuel product having an octane number at least two octane units higher than the first octane number.

19. The method of claim 18, wherein the primary fuel stream is selected from the group consisting of alkylate, aviation gasoline blendstock, finished aviation gasoline product, motor gasoline blendstock, finished motor gasoline product and combinations thereof.

20. The method of claim 1, wherein the cyclic organic compounds are blended with a primary fuel stream to produce a 100 octane aviation gasoline having a lead content lower than 0.56 grams per liter (2 grams per U.S. gallon).

21. The method of claim 1, wherein the cyclic organic compounds comprise at least 50% of toluene and/or benzene by weight.

22. The method of claim 1, wherein the cyclic organic compounds are blended with a primary fuel stream selected from the group consisting of kerosene, biodiesel, a processed biomass stream, or fuel blendstock to produce a fuel product meeting the requirements of ASTM D 910-04a.

23. The method of claim 22, wherein the fuel product has a chemical composition sufficient to allow the fuel product to be used as a substitute or blendstock in United States military fuels JP-8, JP-4 or JP-5 or commercial aviation turbine fuel ASTM D 1655-09.

24. The method of claim 1, wherein the cyclic organic compounds are purified to produce a product meeting ASTM standards, wherein the product is selected from the group consisting of benzene, toluene, cumene, xylene, and ethylbenzene.

25. The method of claim 1, wherein the cyclic organic compounds are processed to remove solvents or purify the cyclic organic compounds.

26. A method for producing a high-octane aviation fuel with low lead content, the method comprising:
cracking a biomass oil at a temperature between about 100° C. and about 800° C. at a pressure between about vacuum conditions and about 2000 psia;
separating a middle distillate mixture containing at least about 50% cyclic organic compounds by weight from the cracked biomass oil;
decarboxylating the middle distillate mixture to produce a mixture of chemical products containing at least about 50% cyclic alkane and alkene compounds by weight; and
blending the mixture of chemical products with a fuel having an octane number below 95 to produce an aviation fuel having an octane number of at least 100, wherein the aviation fuel contains lead at a concentration less than about 0.5 grams per liter.

* * * * *

UNITED STATES PATENT AND TRADEMARK OFFICE
CERTIFICATE OF CORRECTION

PATENT NO. : 8,450,541 B2  Page 1 of 1
APPLICATION NO. : 12/626304
DATED : May 28, 2013
INVENTOR(S) : Wayne S. Seames, Darrin S. Muggli and Brian M. Tande It is certified that error appears in the above-identified patent and that said Letters Patent is hereby corrected as shown below:

In the Specification

Col. 3, Line 8
  Delete "tetrahydro"
  Insert --tetra hydro--

In the Claims

Col. 19, Line 35
  Delete "heated"

Signed and Sealed this
Twenty-sixth Day of November, 2013

Margaret A. Focarino
*Commissioner for Patents of the United States Patent and Trademark Office*